(12) United States Patent
Prebil et al.

(10) Patent No.: US 9,352,518 B2
(45) Date of Patent: May 31, 2016

(54) STAGGERED BEVEL FOR CONTINUOUS COMPRESSION MOLDING TOOLING DIES

(71) Applicants: The Boeing Company, Chicago, IL (US); Toni M. Froeschner, Florissant, MO (US)

(72) Inventors: Charles Richard Prebil, University City, MO (US); Randall Dow Wilkerson, O'Fallon, MO (US); Neal Froeschner, Florissant, MO (US)

(73) Assignee: The Boeing Company, Chicago, IL (US)

( * ) Notice: Subject to any disclaimer, the term of this patent is extended or adjusted under 35 U.S.C. 154(b) by 431 days.

(21) Appl. No.: 13/923,446

(22) Filed: Jun. 21, 2013

(65) Prior Publication Data

US 2014/0374946 A1    Dec. 25, 2014

(51) Int. Cl.
| | | |
|---|---|---|
| B29C 43/22 | (2006.01) | |
| B29C 70/52 | (2006.01) | |
| B29C 70/50 | (2006.01) | |
| B29C 70/46 | (2006.01) | |
| B29L 31/30 | (2006.01) | |
| B29K 101/12 | (2006.01) | |

(52) U.S. Cl.
CPC .............. B29C 70/50 (2013.01); B29C 43/222 (2013.01); B29C 70/46 (2013.01); B29C 70/526 (2013.01); B29K 2101/12 (2013.01); B29L 2031/3076 (2013.01)

(58) Field of Classification Search
USPC .......................... 425/112, 122, 461, 505, 521
See application file for complete search history.

(56) References Cited

U.S. PATENT DOCUMENTS

| 3,992,240 | A | * | 11/1976 | Kuehn, Jr. | ............. | B29C 70/525 |
| | | | | | | 156/250 |
| 4,029,006 | A | * | 6/1977 | Mercer | ...................... | B41J 2/01 |
| | | | | | | 101/35 |
| 4,957,422 | A | * | 9/1990 | Glemet | ................. | B29B 15/122 |
| | | | | | | 425/114 |
| 4,988,278 | A | * | 1/1991 | Mills | ..................... | B29C 70/526 |
| | | | | | | 156/441 |
| 5,084,222 | A | * | 1/1992 | Glemet | ................. | B29C 70/521 |
| | | | | | | 156/180 |
| 5,205,898 | A | * | 4/1993 | Wilson | .................. | B29B 15/125 |
| | | | | | | 118/124 |

(Continued)

FOREIGN PATENT DOCUMENTS

| EP | 056689 A2 | 7/1982 |
| EP | 0056689 A2 | 7/1982 |

(Continued)

OTHER PUBLICATIONS

Extended European Search Report dated Nov. 14, 2014 in related European Patent Application No. 14172915.2.

(Continued)

*Primary Examiner* — Atul P. Khare
(74) *Attorney, Agent, or Firm* — Ostrager Chong Flaherty & Broitman P.C.

(57) ABSTRACT

Continuous compression molded process and apparatus for fabricating thermoplastic composite parts from pre-formed thermoplastic composite laminates with tooling dies have a staggered bevel feature at an entry side of the tooling dies. Staggering the length of the bevel feature in each section between bends in a surface contour along the width of the incoming edge of the tooling dies prevents excess material from being trapped and forming wrinkles in the finished thermoplastic part. The length of the taper in each section along the width of the tooling dies is aligned with a pulsed advancement distance of the pre-formed part.

20 Claims, 7 Drawing Sheets

(56) References Cited

U.S. PATENT DOCUMENTS

| | | | |
|---|---|---|---|
| 5,540,797 A * | 7/1996 | Wilson | B29B 15/122 156/166 |
| 5,747,075 A * | 5/1998 | Gauchel | B29C 70/523 156/433 |
| 6,764,057 B2 * | 7/2004 | Fanucci | B29C 70/526 156/433 |
| 7,807,005 B2 | 10/2010 | Rubin et al. | |
| 7,871,553 B2 | 1/2011 | Wilkerson et al. | |
| 8,123,510 B1 * | 2/2012 | Johnson | B29C 70/526 156/245 |
| 8,333,858 B2 | 12/2012 | Rubin et al. | |
| 8,425,708 B2 | 4/2013 | Rubin et al. | |
| 8,491,745 B2 * | 7/2013 | Wilkerson | B29C 43/22 156/201 |
| 8,747,098 B1 * | 6/2014 | Johnson | B29C 70/526 156/245 |
| 2011/0048624 A1 * | 3/2011 | Nitsch | B29C 70/46 156/228 |
| 2011/0121479 A1 | 5/2011 | Lengsfeld et al. | |
| 2013/0134621 A1 * | 5/2013 | Tsotsis | B29B 11/16 264/177.2 |
| 2013/0136891 A1 * | 5/2013 | Nelson | B29C 70/20 428/114 |

FOREIGN PATENT DOCUMENTS

| | | |
|---|---|---|
| EP | 2599604 A2 | 5/2013 |
| EP | 2599604 A2 | 6/2013 |
| WO | 2009106340 A2 | 9/2009 |

OTHER PUBLICATIONS

Office Action mailed Jul. 9, 2015 from Canadian Intellectual Property Office in corresponding application No. 2,851,940.

* cited by examiner

STAGGERED BEVEL FOR CONTINUOUS COMPRESSION MOLDING TOOLING DIES

TECHNICAL FIELD

This disclosure generally relates to fabrication of thermoplastic composite parts and, more specifically, to a continuous compression molding apparatus and method for fabricating thermoplastic composite parts from thermoplastic composite laminates.

BACKGROUND

Numerous processes exist for fabricating thermoplastic composite parts. In addition to non-continuous processes such as pressing, stamping and autoclave forming, there are continuous processes such as extrusion, pultrusion, roll forming, and compression molding. Examples of continuous fabrication processes for forming straight and curved, continuous length, thermoplastic composite parts having various cross-section configurations are shown in commonly-owned U.S. Pat. No. 7,807,005 (Rubin et al.), U.S. Pat. No. 7,871,553 (Wilkerson et al.) and U.S. Pat. No. 8,333,858 (Rubin et al.), each of which is incorporated in its entirety by reference herein.

The foregoing processes find applicable uses in a wide variety of potential applications including, for example, in the aerospace industry. The processes may be ideally suited for fabricating thermoplastic composite parts, such as stiffened members in the supporting framework of an aircraft fuselage. Examples of thermoplastic composite stiffened members include but are not limited to fuselage skins, wing skins, control surfaces, door panels, access panels, keel beams, floor beams and deck beams.

In a typical implementation of a continuous compression molding (CCM) process for fabricating thermoplastic composite parts, one or more unconsolidated thermoplastic plies is covered on both sides with stainless steel foils or kapton layers to form a thermoplastic composite material blank, which is fed into a CCM process assembly. The CCM process assembly may have a pre-forming unit and a press or consolidation unit provided in sequential relationship with respect to each other. Other units may be included to provide, for example, a curvature along the length of the parts or other shapes or features into the part's pressed shape, or the pre-forming unit or consolidation unit may be configured to provide such features.

The pre-forming unit of the CCM process assembly may have an intake end adapted to receive a continuous supply of flat or planar thermoplastic composite material blank in any defined layup, for example, in the form of spool-rolled material which may be wound on one or multiple spools or, alternatively, in the form of stacked material. The pre-forming unit has forming surfaces that form the thermoplastic composite material blank into a pre-formed laminate having a selected cross-section configuration. The pre-forming unit may use a variety of forming surfaces and have any design known to those skilled in the art suitable for imparting the selected cross-section configuration to the thermoplastic composite material blank.

The pre-formed laminate having the selected cross-section configuration exits the pre-forming unit and enters the consolidation unit of the CCM process assembly, where the one or multiple plies in the pre-formed laminate are consolidated to form a single, pressed and integrated thermoplastic composite part, such as the stiffened members described above, using the application of heat and pressure. Referring to FIG. 1, for example, a consolidation unit may include one or more matched sets of tooling dies 1 that may be mated with the forming surfaces of the pre-forming unit. An upper tooling die 2 in the matched sets of tooling dies 1 is provided with a first contoured surface 3 matching the contour of an upper surface 4 of the pre-formed laminate 5 (which is shown advancing between the tooling dies 1). A lower tooling die 6 is provided with a second contoured surface 7 complementary to the first contoured surface 3 and matching the contour of a lower surface 8 of the pre-formed laminate 5. The tooling dies 1 may be coupled to mechanical, electrical, hydraulic, pneumatic or other types of actuators (not shown), which move the upper tooling die 2 and lower tooling die 6 toward and away from each other between an extended, tool-closed position (as shown in FIG. 1) and a retracted, tool-open position. As the pre-formed laminate 5 moves between the upper tooling die 2 and lower tooling die 6, the pre-formed laminate 5 is heated and the tooling dies 1 provide pressure sufficient to consolidate the thermoplastic plies in the pre-formed laminate 5 into a desired shape and thickness.

It has been determined that when a pre-formed laminate 5 has a cross-section configuration with two or more bends, and three or more segments, such as the "hat" shaped cross-section configuration shown in FIG. 1, the stainless steel foils or kapton layers surrounding one or both sides of the thermoplastic plies in the pre-formed laminate 5 may get trapped by angled side segments 9 of the tooling dies 1 as the pre-formed laminate 5 is advanced into and through the tooling dies 1. This prevents the pre-formed laminate 5 from slipping well along the surfaces 3, 7 of the tooling dies 1, and may cause wrinkles 10 to form in the foils and/or the pre-formed laminate 5. Wrinkling of the foils and/or pre-formed laminate 5 reduces part quality and increases scrap rate and production costs. There is therefore a need to improve processing techniques and facilities to enable fabrication of thermoplastic composite parts without wrinkles in the composite material or the foil or kapton material layers, to decrease scrap rate and production costs, and increase part quality and other efficiencies.

SUMMARY

The foregoing purposes, as well as others that will be apparent, are achieved generally by providing tooling dies in CCM processes to fabricate thermoplastic composite parts, wherein the tooling dies have a staggered bevel feature at an entry side of the tooling dies. It has been determined that staggering the length, from the incoming edge of the tooling dies, of the bevel feature in each segment of a cross-section configuration prevents excess material from being trapped between the tooling dies and wrinkles from forming in the finished thermoplastic parts.

One aspect of the subject matter disclosed in detail below is a tooling die for fabricating a thermoplastic composite part in a continuous compression molding process. The tooling die has a contoured surface with a cross-section configuration including at least a first bend forming at least a first segment and a second segment in the cross-section configuration. A bevel feature is included at an entry side of the tooling die that extends a first length from the entry side in the first segment and extends a second length larger than the first length from the entry side in the second segment. The second segment is positioned closer than the first segment to an outer edge of the tooling die.

Another aspect is a method for fabricating a thermoplastic composite part, comprising the steps of pre-forming a thermoplastic composite material blank into a pre-formed laminate having a cross-section configuration including at least a first bend forming at least a first segment and a second segment in the cross-section configuration; and providing a die press having upper and lower tooling dies with contoured surfaces matched to the cross section configuration of the pre-formed laminate and a bevel feature at an entry side of the tooling dies that extends a first length from the entry side in the first segment of the cross-section configuration and extends a second length larger than the first length from the entry side in the second segment of the cross-section configuration; and consolidating the pre-formed laminate the die press. The second segment of the cross-section configuration is positioned closer than the first segment to an outer edge of the tooling dies.

A further aspect is a method for preventing surface mark-off of a continuous compression molded thermoplastic composite part, comprising the steps of: pre-forming a pre-formed laminate having a cross-section configuration including at least a first bend forming at least a first segment and a second segment in the cross-section configuration; feeding the pre-formed laminate into a staggered bevel feature at an entry side of upper and lower tooling dies having contoured surfaces matched to the cross-section configuration of the pre-formed laminate; and advancing the pre-formed laminate through the tooling dies to apply pressure from the staggered bevel feature in the first segment before pressure is applied in the second segment. The second segment of the cross-section configuration is positioned closer than the first segment to an outer edge of the tooling dies.

It has been also been determined that the length of the bevel feature in each segment of the cross-section configuration may be aligned with a pulse distance that the pre-formed laminate advances, such that the length of the bevel feature in an innermost segment of the cross-section configuration has the shortest length, and the bevel feature in each successive segment toward the outer edges of the tooling dies is incrementally longer by an even multiple of the pulse distance.

Other objects, features and advantages of the staggered bevel will be apparent when the detailed description is considered in conjunction with the following drawings.

BRIEF DESCRIPTION OF THE DRAWINGS

Various embodiments will be hereinafter described with reference to drawings for the purpose of illustrating the foregoing and other aspects of the disclosure.

Reference will hereinafter be made to the drawings in which similar elements in different drawings bear the same reference numerals.

DETAILED DESCRIPTION

The following detailed disclosure describes methods and an apparatus for continuous compression molding (CCM) of thermoplastic composite laminates with tooling dies in the consolidation unit of a CCM process assembly having a staggered bevel feature at or proximate to an incoming edge of the tooling dies. The staggered bevel feature permits excess material of a pre-formed laminate to be pushed laterally outward from the middle of the tooling dies toward the sides of the tooling dies as the pre-formed laminate advances through the tooling dies, and therefore prevents wrinkles from forming in the finished thermoplastic composite part.

Figure 2C:
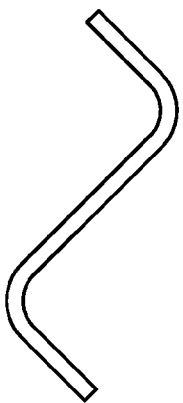
FIGS. 2A to 2E are diagrams showing sectional views of thermoplastic composite parts that may be manufactured having cross-section configurations in the shape of a "U", "I", "Z", "J" and "hat" configuration, respectively.
Figure 2B:
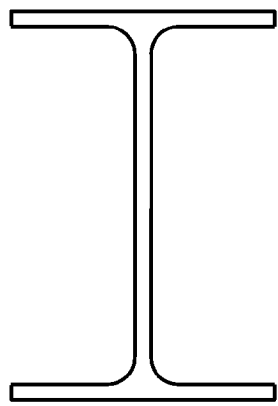
Figure 2E:
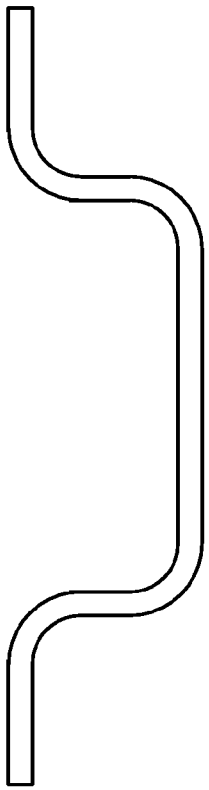
Figure 2A:
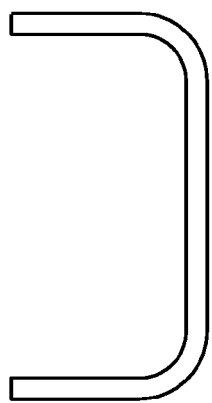
Figure 2D:
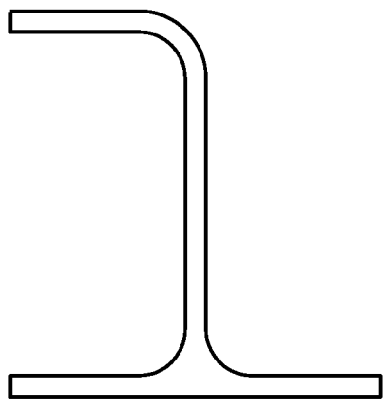

The disclosed methods and apparatus may be used with CCM processes to fabricate thermoplastic composite parts having any cross-section configuration including, for example, cross-section configurations that are planar or have one or more bends or curves that form two or more segments, such as in a "V" shape cross-section configuration. The staggered bevel feature of the methods and apparatus provides enhancements when fabricating thermoplastic composite parts with cross-section configurations that have two or more bends, which form three or more segments in the cross-section configuration, such as "U" (or channel), "I", "Z", "J", "T" shaped cross-section configurations or any other desirable cross-section configurations. Examples of cross-section configurations for thermoplastic composite parts formed with continuous fabrication processes are shown in FIGS. 2A-2E as follows: FIG. 2A (channel); FIG. 2B (I-beam); FIG. 2C (Z-beam), FIG. 2D (J-beam) and FIG. 2E (hat).

Figure 1:
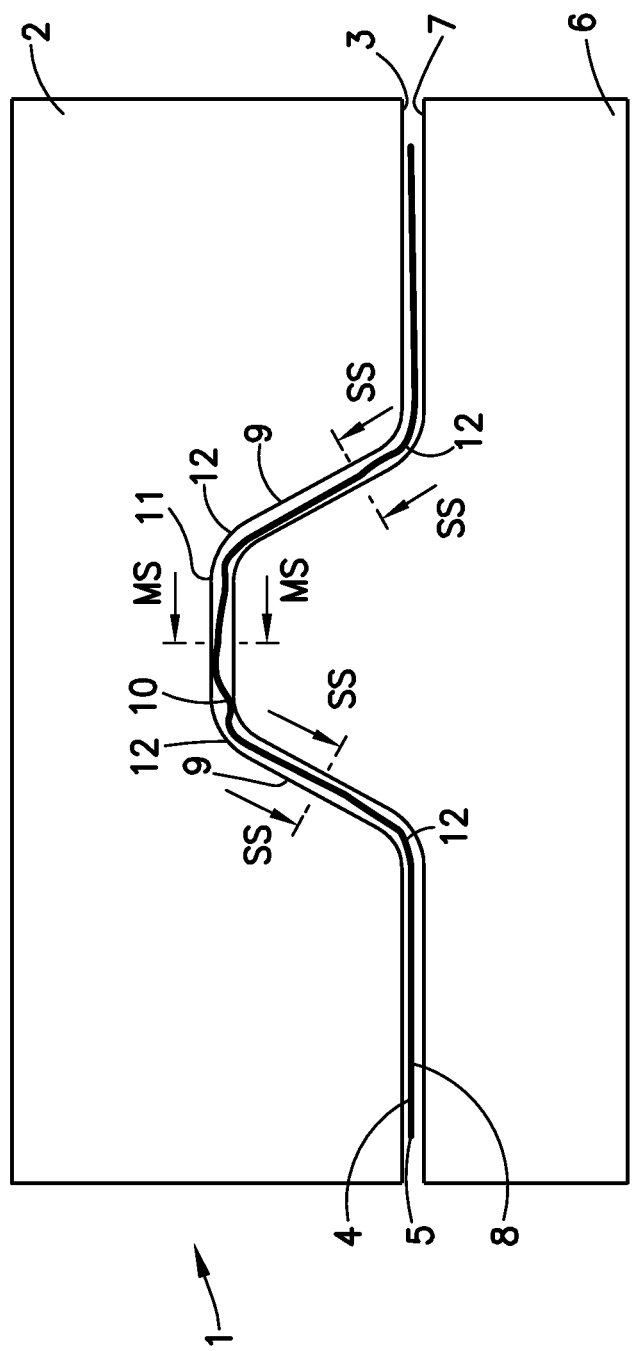
FIG. 1 is a diagram showing an end view of upper and lower tooling dies for fabricating a "hat" shaped thermoplastic composite part.

CCM process assemblies typically employ a consolidation unit having tooling dies of the type shown in FIG. 1. FIG. 1 shows an entry end view across the width of a set of tooling dies 1. An upper tooling die 2 has a first contoured surface 3 and a lower tooling die 6 has a second contoured surface 7 complementary to the first contoured surface 3. The contoured surfaces 3, 7 form a cross-section configuration in the shape of a "hat" having a middle segment 11 surrounded by first and second angled side segments 9, and bends 12 between the middle segment 11 and the side segments 9.

The entry end of tooling dies 1 is adapted to receive the pre-formed laminate 5 from an outlet end of the pre-forming unit. The entry end may have a rounded incoming edge and a bevel feature proximate the incoming edge to prevent mark-off and accommodate the bulk factor of the plies in the pre-formed laminate 5 as it enters the consolidation unit (i.e., to provide sufficient clearance between the first contoured surface 3 of the upper tooling die 2 and the second contoured surface 7 of the lower tooling die 6 for entry of the pre-formed laminate 5). The bevel feature includes a taper portion that provides a space between the contoured surfaces 3, 7 of the upper tooling die 2 and lower tooling die 6 that is wider at the incoming edge and gradually decreases to provide a gradually increasing pressure as the contoured surfaces 3, 7 get closer together.

Figure 3A:
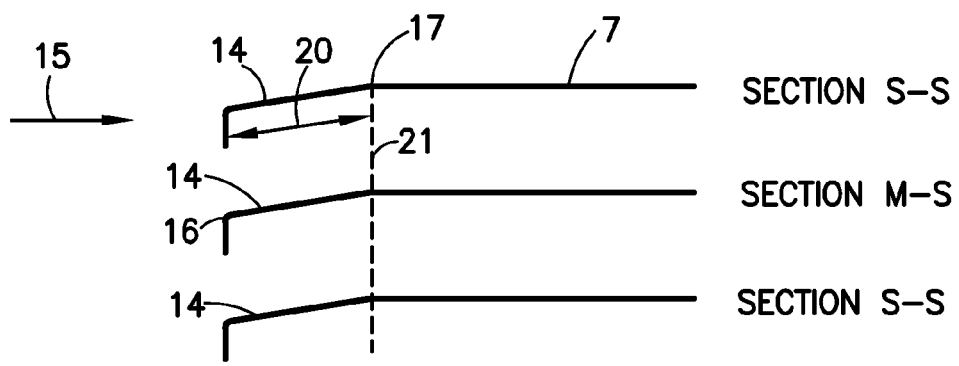
FIG. 3A is a diagram showing partial cross-section views of a bevel feature in the surface contour of a lower tooling die taken along the lines SS-SS, MS-MS and SS-SS in FIG. 1.
Figure 3B:
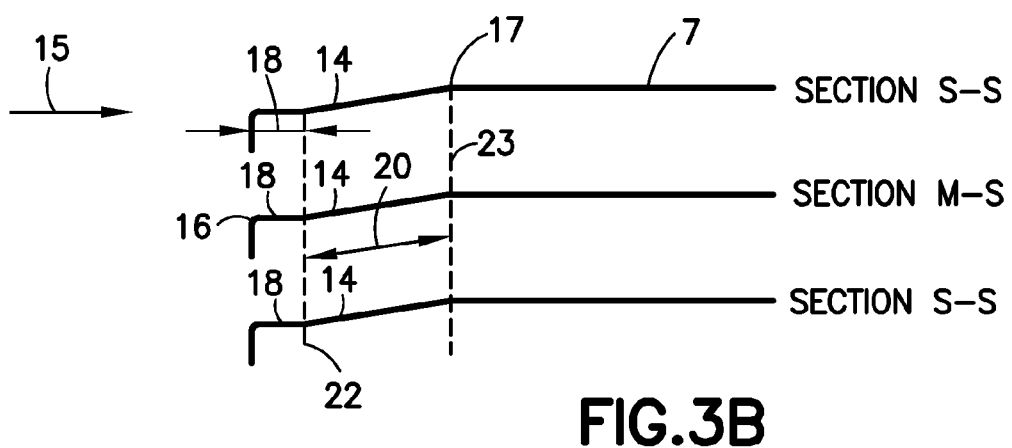
FIG. 3B is a diagram showing partial cross-section views of an alternative bevel feature in the surface contour of a lower tooling die taken along the lines SS-SS, MS-MS and SS-SS in FIG. 1.

FIGS. 3A and 3B show partial cross-section views of the contoured surface 7 proximate the incoming edge 16 of the lower tooling die 6 taken in a lengthwise direction along the lines SS-SS (showing the surface contour at side segments 9) and the line MS-MS (showing the surface contour at middle segment 11) of FIG. 1. Partial cross-section views of the contoured surface 3 of the upper tooling die 2 would be the same. The pre-formed laminate 5 travels through the tooling dies 1 in the direction shown by arrow 15. The incoming edges 16 are rounded to provide a smooth entry to the tooling dies 1. The contoured surface 7 proximate the incoming edges 16 includes a bevel feature comprising a taper portion 14 that gradually raises the contoured surface 7 upward from the incoming edge 16 until the contoured surface 7 reaches a desired height 17.

As shown in FIG. 3A, the taper portion 14 may commence at the incoming edge 16 and extend a taper length 20 from the incoming edge 16 to the desired height 17 of the contoured surface 7. The taper length 20 is the same at the middle segment 11 and the side segments 9, as shown by the dotted line 21. In FIG. 3B, the taper portion 14 commences a short distance 18 from the incoming edge 16 and extends the taper length 20 to the desired height 17. The short distance 18 and the taper length 20 are the same at the middle segment 11 and the side segments 9, as shown by the dotted lines 22 and 23 in FIG. 3B. The short distance 18 from the incoming edge 16 may be flat (as shown in FIG. 3B) or it may include a second taper portion (not shown) having an angle of inclination that is different from an angle of inclination of the taper portion 14.

It has been determined that staggering the length of the taper portion in the bevel feature in each segment of a cross-section configuration, when measured from the incoming edge of the tooling dies or a short distance from the incoming edge, prevents excess material from being trapped between the tooling dies and wrinkles from forming in thermoplastic composite parts. The taper portions should be arranged such that the length of the taper portion in the middle segment of the cross-section configuration is the shortest taper, and the length of the taper portions in each successive adjacent segment moving out toward the sides of the tooling dies is incrementally longer than the length of the taper portion in the previous successive adjacent segment. Staggering the length of the taper portions in this manner allows excess material of the pre-formed laminate to be pushed laterally outward toward the sides of the tooling dies, from the middle segment to the next adjacent segment on either side of the middle segment and then to the next adjacent segment as the pre-formed laminate is advanced through the tooling dies.

Figure 4:
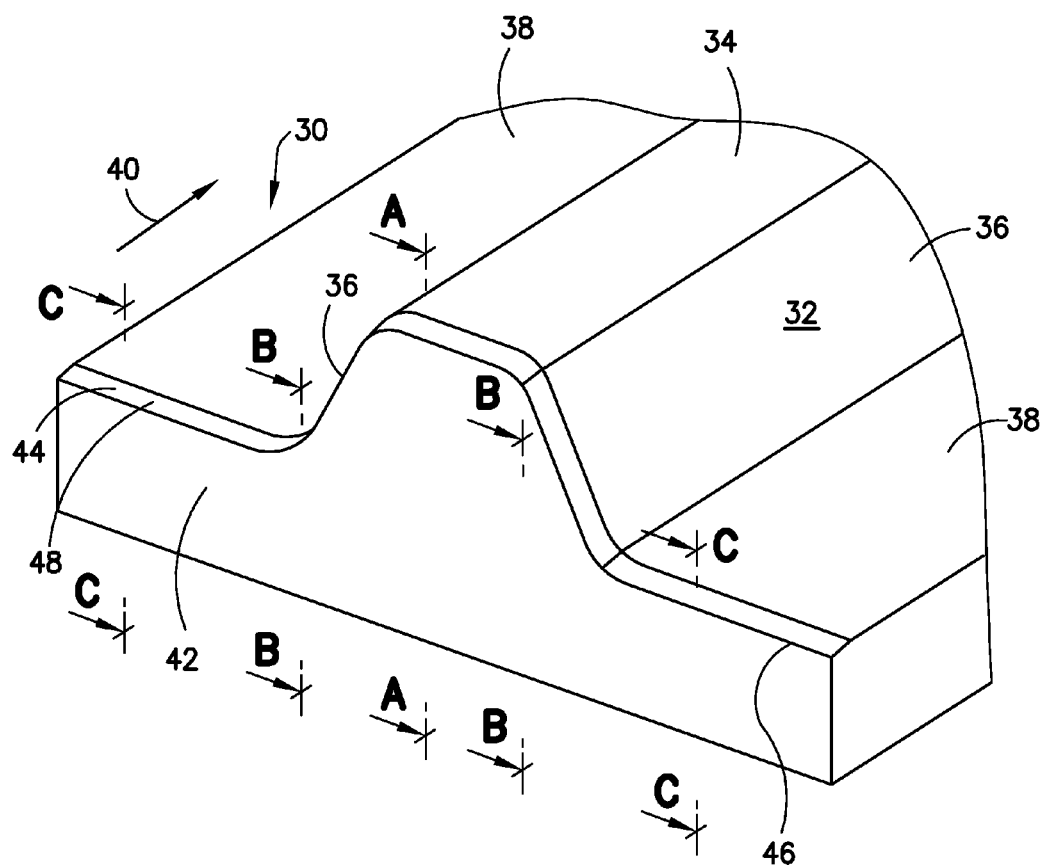
FIG. 4 is a diagram showing a perspective view of a lower tooling die.

An exemplary lower tooling die 30 employing a staggered bevel feature is shown in FIG. 4. The tooling die 30 has a contoured surface 32 for consolidating a pre-formed laminate with a hat shaped cross-section configuration. The surface contour 32 has a middle segment 34, and side segments 36 and outer segments 38 on both sides of the middle segment 34. The staggered bevel feature disclosed herein may be employed with any cross-section configuration, but the advantages of the staggered bevel feature are enhanced with cross-section configurations having at least two bends and three segments of the type shown, for example, in FIGS. 2A-2E.

The lower tooling die 30 is the male portion of a set of tooling dies 1, and is used with an upper tooling die (not shown) having a complementary contoured surface. The arrow 40 in FIG. 4 shows the direction that a pre-formed laminate advances through the tooling dies from an entry side 42 to an exit side (not shown).

The entry side 42 of the tooling die 30 includes a bevel feature 44 that increases the space at the entry side 42 between the contoured surface 32 of the lower tooling die 30 and the complementary contoured surface of an upper tooling die to accommodate the bulk factor of a pre-formed laminate that is inserted between the tooling dies of the consolidation unit. The bevel feature 44 extends a length from an incoming edge 46 of the tooling die 30, and may include a taper portion 48 extending from the incoming edge 46 (FIG. 5A) or a short distance from the incoming edge 46 (FIG. 5B).

Figure 5A:
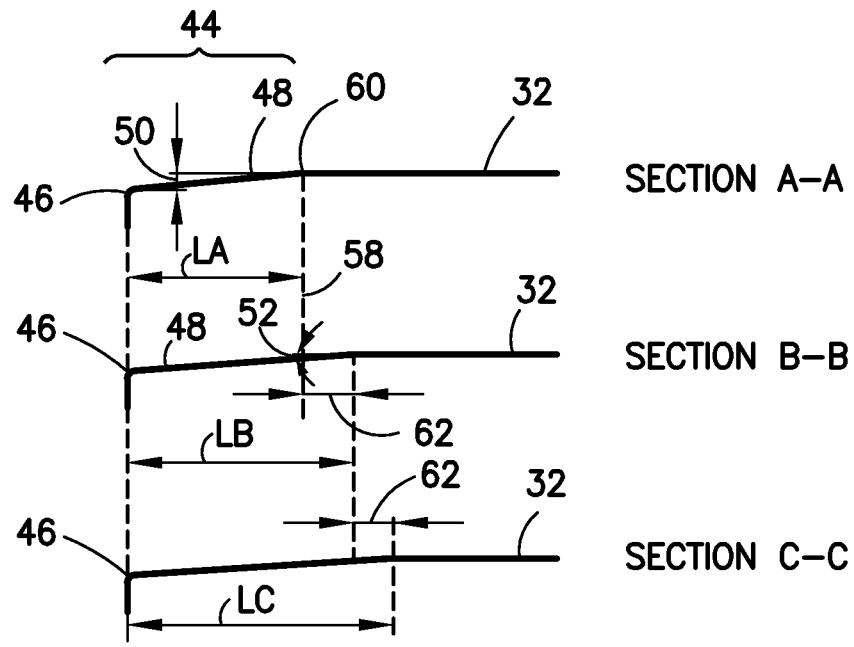
FIG. 5A is a diagram showing partial cross-section views of a staggered bevel feature in the surface contour of the lower tooling die taken along the lines A-A, B-B and C-C in FIG. 4.
Figure 5B:
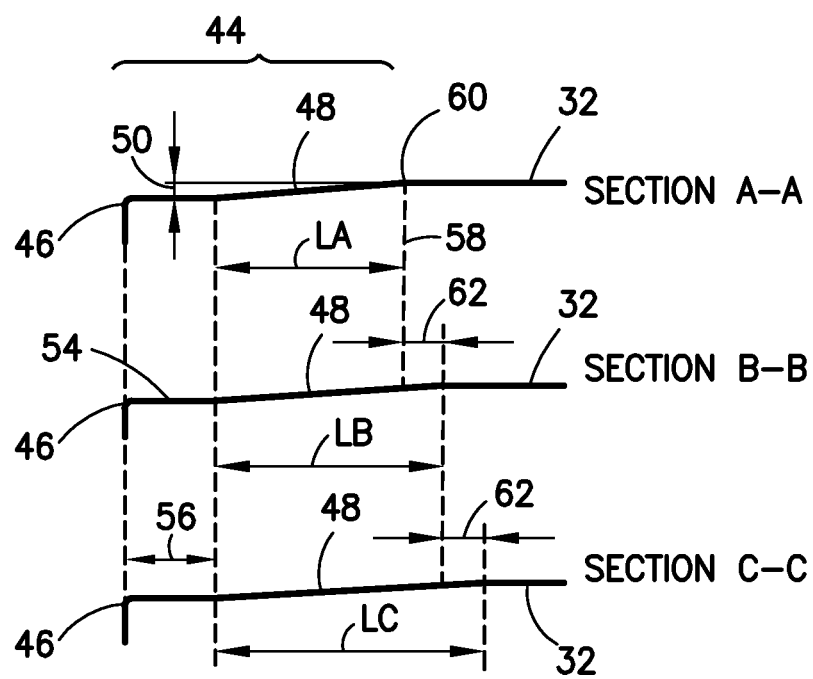
FIG. 5B is a diagram showing partial cross-section views of an alternative staggered bevel feature in the surface contour of the lower tooling die taken along the lines A-A, B-B and C-C in FIG. 4.

FIGS. 5A and 5B show exemplary staggered bevel features that may be employed in the exemplary lower tooling die 30 in three partial cross-section views taken along the lines A-A, B-B and C-C in FIG. 4. The cross-section at line A-A shows the bevel feature in the middle segment 34. The cross-section at line B-B shows the bevel feature in the side segments 36. The cross-section at line C-C shows the bevel feature in the outer segments 38. In each of the segments 34, 36 and 38, the incoming edge 46 is rounded to a sufficient degree to prevent a sharp edge that could snag, break or rip the pre-formed laminate as it enters the tooling dies. The bevel feature is provided to lower the incoming edge 46 to a depth 50 below the contoured surface 32.

Referring to FIG. 5A, the bevel feature in each of the segments comprises a gradually increasing, upward taper portion 48 that extends a length LA, LB or LC from the lowered incoming edge 46 until the taper portion 48 reaches a desired height. The taper portion 48 is provided at an angle 52 determined by the desired depth 50 and length LA, LB or LC of the bevel features, as described above.

In an alternative embodiment shown in FIG. 5B, the bevel feature 44 in each of the segments may also include a flat section 54 positioned between the incoming edge 46 and the taper portions 48. The flat section 54 has a length 56 that extends up to approximately 3 inches from the incoming edge 46, preferably about 2 inches. The length 56 of the flat section 54 is the same in each of the middle segment 34, the side segments 36 and the outer segments 38.

The length LA, LB and LC of the taper portion 48 in the middle segment 34, the side segments 36 and the outer segments 38, respectively, is different. The length LA of the taper portion 48 in the middle segment 34 is the shortest (i.e., the bevel feature 44 in the middle segment 34 ends closest to the incoming edge 46). The length LB of the taper portion 48 in the side segments 36 is longer than the length LA of the taper portion 48 in the middle segment 34. The length LC of the taper portion 48 in the outer segments 38 is longer than the length LB of the taper portion 48 in the side segments 36, and is therefore the longest taper portion 48. Therefore, the length of the bevel feature 44 from the incoming edge 46 in each of the segments 34, 36, 38 is staggered to provide a bevel feature in the middle segment having the shortest length and the bevel feature in the outer segments having the longest length, with the length of the bevel feature in each successive adjacent segment from the middle segment to the outer segments being larger than the immediately previous adjacent segment.

Staggering the length of the taper portion 48 and therefore the length of the bevel feature 44 in the middle segment 34, the side segments 36 and the outer segments 38 is shown by the vertical dotted lines 58 in FIGS. 5A and 5B, which indicate the border 60 between the bevel feature 44 and the contoured surface 32 of the tooling die 30. The border 60 in the middle segment (shown in cross-section A-A) is closest to the incoming edge 46, thus the bevel feature 44 in the middle segment 34 is the shortest. Similarly, the border 60 in the outer segment 38 is the longest distance from the incoming edge 46, thus the bevel feature 44 in the outer segment 38 is the longest.

The difference between the lengths LA, LB, LC of the taper portion 48 in adjacent segments, or the stagger increment 62, should be approximately equal. For example, the length LA of the taper portion 48 in the middle segment 34 may be ¼" shorter than the length LB of the taper portion 48 in the side segments 36, which may be ¼" shorter than the length LC of the taper portion 48 in the side outer segments 38. The stagger increment 62 may vary from about ⅛ inch to about 1 inch based on the size and shape of the pre-formed laminates, provided all of the stagger increments 62 are approximately equal.

Consolidation units in a CCM process assembly may have a pulsating device that advances the pre-formed laminate incrementally forward within the consolidation unit and away from the pre-forming unit while the tooling dies are in the retracted, tool-open position. The pre-formed laminate may be incrementally advanced a predetermined discreet length (i.e., a pulse distance), for example, ¼", ½" or ¾", depending on factors such as the materials used and the desired level of consolidation. The upper and lower dies are moved toward each other at a predefined force or pressure sufficient to consolidate the portion of the pre-formed laminate between the tooling dies when the forward movement of the pre-formed laminate is stopped, and then the dies are opened to permit the pre-formed laminate to advance the pulse distance. This process of advancement and stopping is repeated until the full length of the pre-formed laminate is consolidated.

The stagger increment 62 is selected to be an even multiple of (e.g., 1, 2, 3 or more times) the pulse distance. For example, if the pulse distance of the pre-formed part is ¼" every ten seconds, the stagger increment 62 of the bevel feature 44 may be ¼", ½" or ¾". Therefore, the stagger increment 62 of the bevel feature 44 is aligned with the pulse distance of the pre-formed laminate.

The depth 50 and lengths LA, LB, LC of the taper portion 48 in the bevel feature 44 are generally determined based on the shape of the thermoplastic composite part that is to be fabricated. The depth 50 may be based on the thickness of a pre-formed laminate as it exits the pre-forming unit. The depth 50 of the bevel feature 44 at the incoming edge 46 is preferably between 0.050 to 0.300 inches below the height of the contoured surface 32. The length of the taper portion 48 and therefore the bevel feature 44 may be determined based on properties of the thermoplastic composite laminate materials and should be different in each segment of the cross-section configuration to form a staggered bevel feature 44 as described above. The length of the bevel feature 44 in each of the middle segment 34, side segments 36 and outer segments 38 from the incoming edge 46 to the border 60 between the bevel feature 44 and the contoured surface 32 of the tooling die 30 may be in the range of about 2 to 6 inches.

Figure 6:
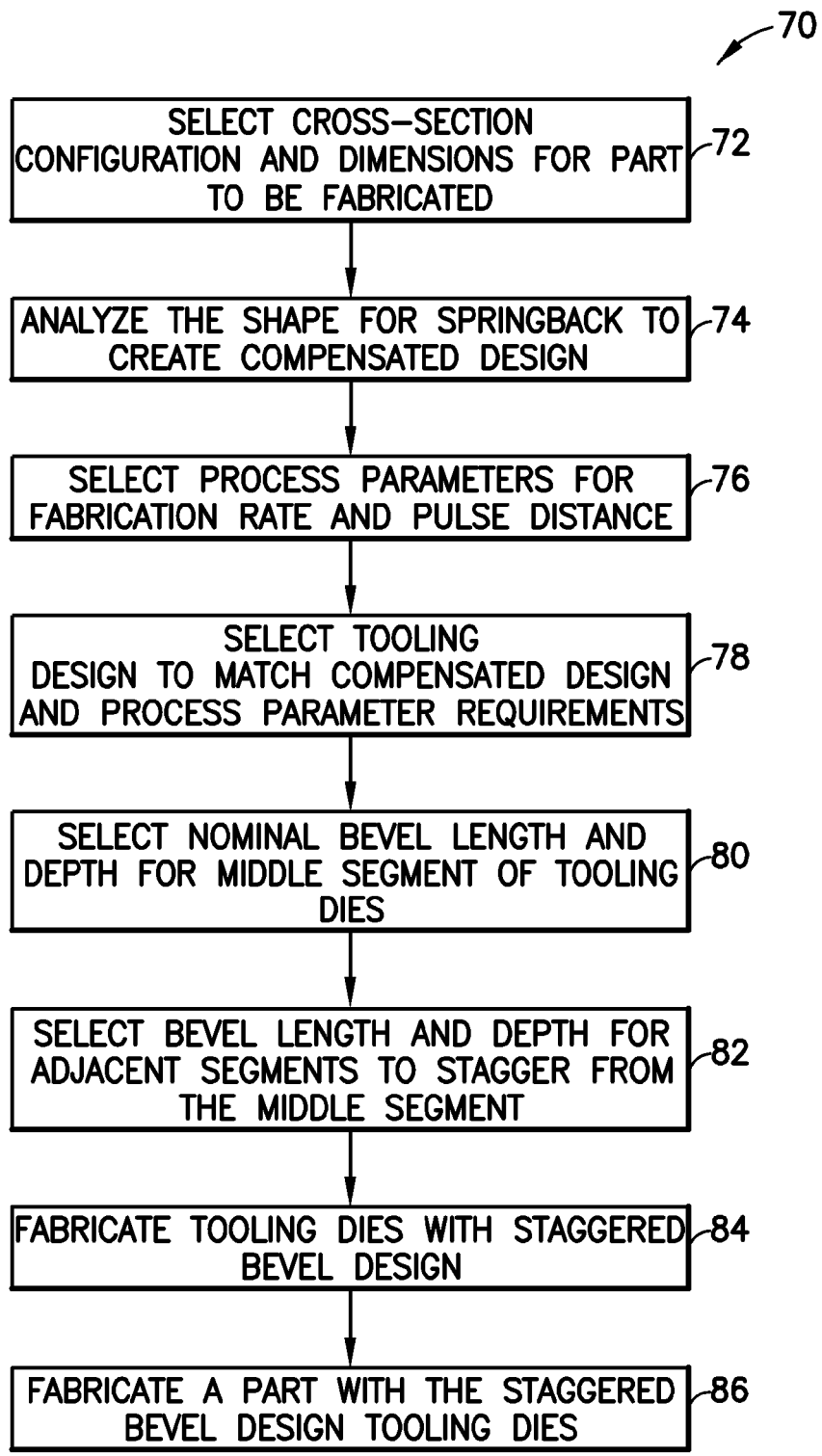
FIG. 6 is a flow diagram showing a continuous compression molding process using a staggered beveled feature.

FIG. 6 is a flow chart of a continuous compression molding process 70 using a tooling die with a staggered beveled feature to fabricate a thermoplastic composite part. In step 72, the cross-section configuration of the thermoplastic composite part to be fabricated is selected and the desired size and shape are determined. The shape of the part is then analyzed in step 74 for springback to create a compensated design. In step 76, the fabrication rate and pulse distance are selected based on the size and shape of the thermoplastic composite part to be fabricated, and other process parameters known in the art. In step 78, a tooling design is selected to match the compensated design of the part to be fabricated, and process parameters such as heat, pressure and advance speed and distance are determined. The tooling design is refined in step 80 to determine the nominal bevel length and depth for the middle segment 34 of the tooling die 30. The bevel length and depth of the side segments 36 and any additional segments, such as the outer segments 38 are then determined in step 82, such that the lengths LA, LB, LC of taper portions 48 of each successive, adjacent segment from the middle segment 34 is larger than the immediately previous adjacent segment as described above. Tooling dies with a staggered bevel design are then fabricated in step 84, and a thermoplastic composite part is fabricated using the tooling dies with a staggered bevel design in step 86.

Figure 7:
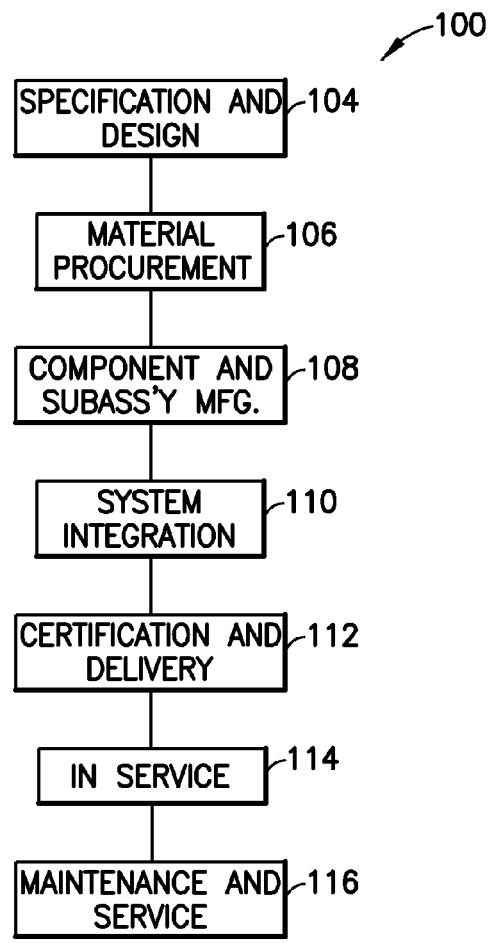
FIG. 7 is a flow diagram of an aircraft production and service methodology.
Figure 8:
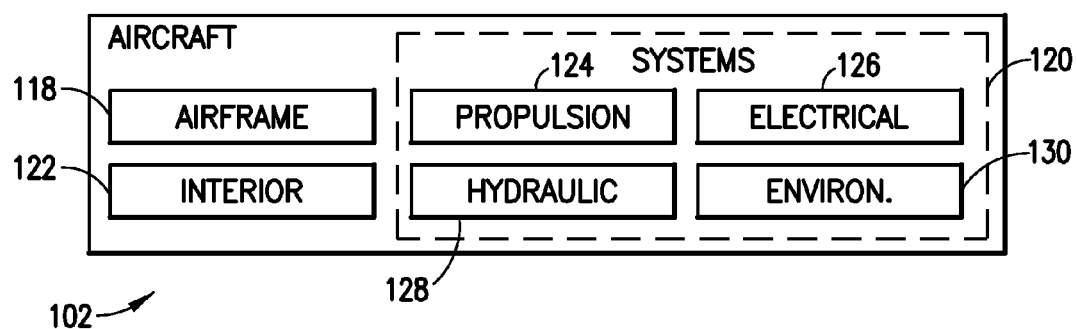
FIG. 8 is a block diagram of an aircraft.

Embodiments of this disclosure may be described in the context of an aircraft manufacturing and service method 100 as shown in FIG. 7 and an aircraft 102 as shown in FIG. 8. During pre-production, exemplary method 100 may include specification and design 104 of the aircraft 102 and material procurement 106 including design of tooling dies and CCM processes for fabricating thermoplastic composite parts. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries that utilize thermoplastic composite parts.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

While the invention has been described with reference to certain exemplary embodiments, such embodiments are for purposes of illustration and not limitation. It will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

We claim:

1. A tooling die set for fabricating a thermoplastic composite part from a pre-formed composite laminate in a continuous compression molding process, the die set comprising:
   upper and lower spaced tooling dies having complimentary contoured surfaces each with a cross-sectional configuration including at least a first bend forming at least a first segment and a second segment in the cross-sectional configuration, the second segment positioned closer than the first segment to an outer side edge of the die set; and
   a staggered bevel feature bordering an entry side of at least one of the upper and lower tooling dies, the bevel feature comprising a first taper portion in the first segment extending a first length from the entry side and a second taper portion in the second segment extending a second length incrementally larger than the first length from the entry side.

2. The tooling die set of claim 1, wherein the cross-sectional configuration further comprises at least a second bend forming a third segment in the cross-sectional configuration, the bevel feature further comprising a third taper portion in the third segment extending a third length from the entry side incrementally larger than the second length in the second segment, the third segment positioned closer than the second segment to the outer side edge of the tooling die.

3. The tooling diesel of claim 2, wherein a difference between the second length and the first length is approximately equal to the difference between the third length and the second length.

4. The tooling die set of claim 3, wherein each of the differences in length is in the range of about ⅛ inch to about 1 inch.

5. The tooling die set of claim 2, wherein the first length, the second length, and the third length are in the range of about 2 inches to 6 inches.

6. The tooling die set of claim 2, wherein the cross-sectional configuration further comprises:
   two of the first bends, each at opposing ends of the first segment in the cross-sectional configuration such that two of the second segments are formed each extending from a respective first bend; and
   two of the second bends, each at an end of a respective second segment opposing a respective first bend such that the two of the third segments are formed each extending from a respective second bend.

7. The tooling die set of claim 6, wherein the entry side of the at least one tooling die comprises a rounded incoming edge.

8. The tooling die set of claim 6, wherein the cross-sectional configuration is hat-shaped.

9. The tooling die set of claim 1, wherein the first taper portion and the second taper portion extend from an incoming edge at the entry side of the at least one tooling die to a desired height such that the incoming edge is a desired depth below the desired height.

10. The tooling die set of claim 9, wherein the desired depth is in the range of 0.050 inch to 0.300 inch.

11. The tooling die set of claim 1, wherein the bevel feature comprises a flat section positioned between an incoming edge at the entry side of the at least one tooling die and each of the first taper portion and the second taper portion, the first taper portion and the second taper portion extending to a desired height such that the incoming edge and the flat section are a desired depth below the desired height.

12. The tooling die set of claim 11, wherein the desired depth is in the range of 0.050 inch to 0.300 inch.

13. A tooling die set for fabricating a thermoplastic composite part from a pre-formed composite laminate in a continuous compression molding process, the die set comprising:
   upper and lower spaced tooling dies having complimentary contoured surfaces each with a cross-sectional configuration including a first bend forming a first segment and a second segment and including a second bend forming a third segment, in the cross-sectional configuration; and
   a staggered bevel feature bordering an entry side of at least one of the upper and lower tooling dies the bevel feature comprising a first taper portion in the first segment extending a first length from the entry side, a second taper portion in the second segment extending a second length from the entry side incrementally larger than the first length, and a third taper portion in the third segment extending a third length from the entry side incrementally larger than the second length, the second segment positioned closer than the first segment to an outer side edge of the tooling die, and the third segment positioned closer than the second segment to the outer side edge of the tooling die.

14. The tooling die set of claim 13, wherein a difference between the second length and the first length is approximately equal to the difference between the third length and the second length.

15. The tooling die set of claim 14, wherein each of the differences in length is in the range of about ⅛ inch to about 1 inch.

16. The tooling die set of claim 13, wherein the first taper portion, the second taper portion, and the third taper portion each extend from an incoming edge at the entry side of the at least one tooling die to a desired height at a border of the contoured surface such that the incoming edge is a desired depth below the desired height.

17. The tooling die set of claim 13, wherein the bevel feature comprises a flat section positioned between an incoming edge at the entry side of the at least one tooling die and each of the first taper portion, the second taper portion, and the third taper portion, the first taper portion, the second taper portion, and the third taper portion extending to a desired height such that the incoming edge and the flat section are a desired depth below the desired height.

18. The tooling die set of claim 13, wherein the cross-sectional configuration further comprises:
   two of the first bends, each at opposing ends of the first segment in the cross-sectional configuration such that two of the second segments are formed each extending from a respective first bend; and
   two of the second bends, each at an end of a respective second segment opposing a respective first bend such that the two of the third segments are formed each extending from a respective second bend.

19. The tooling die set of claim 18, wherein the entry side of the at least one tooling die comprises a rounded incoming edge.

20. The tooling die set of claim 18, wherein the cross-sectional configuration is hat-shaped.

\* \* \* \* \*